No. 809,444. PATENTED JAN. 9, 1906.
R. L. IVEY & R. D. McDONALD.
TURPENTINE BOX CUTTING MACHINE.
APPLICATION FILED APR. 4, 1905.

WITNESSES:

INVENTORS.
ROMULUS. L. IVEY.
RONALD. D. McDONALD.
BY
ATTORNEYS

No. 809,444. PATENTED JAN. 9, 1906.
R. L. IVEY & R. D. McDONALD.
TURPENTINE BOX CUTTING MACHINE.
APPLICATION FILED APR. 4, 1905.

WITNESSES:

INVENTORS.
ROMULUS. L. IVEY.
RONALD. D. McDONALD.
ATTORNEYS

No. 809,444. PATENTED JAN. 9, 1906.
R. L. IVEY & R. D. McDONALD.
TURPENTINE BOX CUTTING MACHINE.
APPLICATION FILED APR. 4, 1905.

WITNESSES:
E. M. Callaghan
Perry B. Turpin

INVENTORS.
ROMULUS. L. IVEY.
RONALD. D. McDONALD.
BY Munn & Co.
ATTORNEYS

No. 809,444. PATENTED JAN. 9, 1906.
R. L. IVEY & R. D. McDONALD.
TURPENTINE BOX CUTTING MACHINE.
APPLICATION FILED APR. 4, 1905.

WITNESSES:
E. M. Callaghan
Percy B. Turpin

INVENTORS
ROMULUS. L. IVEY.
RONALD. D. McDONALD.
BY Munn & Co.
ATTORNEYS

No. 809,444. PATENTED JAN. 9, 1906.
R. L. IVEY & R. D. McDONALD.
TURPENTINE BOX CUTTING MACHINE.
APPLICATION FILED APR. 4, 1905.

WITNESSES:

INVENTORS.
ROMULUS L. IVEY.
RONALD D. McDONALD.
BY
ATTORNEYS

UNITED STATES PATENT OFFICE.

ROMULUS LESLIE IVEY AND RONALD DONAL McDONALD, OF DE LAND, FLORIDA, ASSIGNORS OF ONE-THIRD TO SIDNEY V. HOUGH, OF DE LAND, FLORIDA.

TURPENTINE-BOX-CUTTING MACHINE.

No. 809,444.  Specification of Letters Patent.  Patented Jan. 9, 1906.

Application filed April 4, 1905. Serial No. 253,847.

*To all whom it may concern:*

Be it known that we, ROMULUS LESLIE IVEY and RONALD DONAL McDONALD, citizens of the United States, and residents of De Land, in the county of Volusia and State of Florida, have made certain new and useful Improvements in Turpentine-Box-Cutting Machines, of which the following is a specification.

This invention is a machine for use in cutting turpentine-boxes in turpentine-bearing trees; and the invention consists in certain novel constructions and combinations of parts, as will be hereinafter described and claimed.

In carrying out the invention we employ a main frame for supporting the several movable parts and comprising in the construction shown the uprights having the front bars A and the rear bars B, the uprights being spaced apart, forming a way A' between them, in which the cross-head may be adjusted up and down, and the front and rear bars of the uprights being spaced apart, forming between them ways $a'$, in which slide the laterally-projecting guide portions or lugs on the cross-head, presently described.

Figure 1:
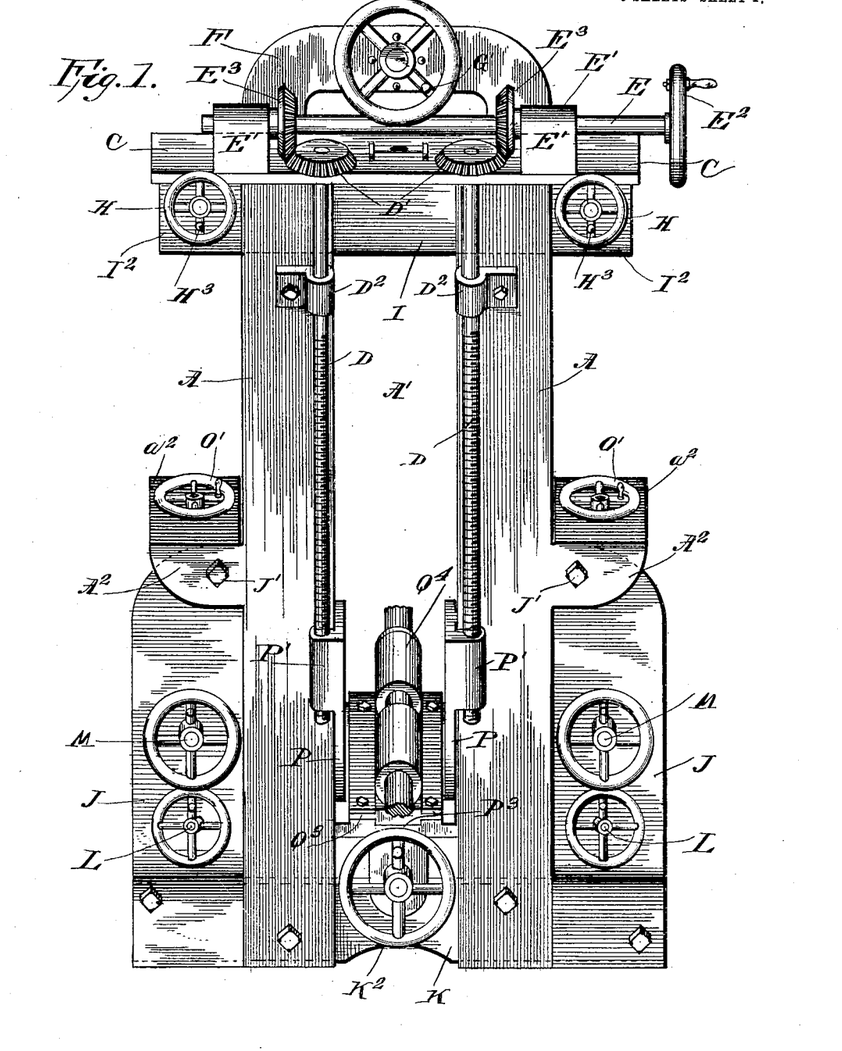
Figure 1 is a front elevation of a machine embodying our invention.
Figure 2:
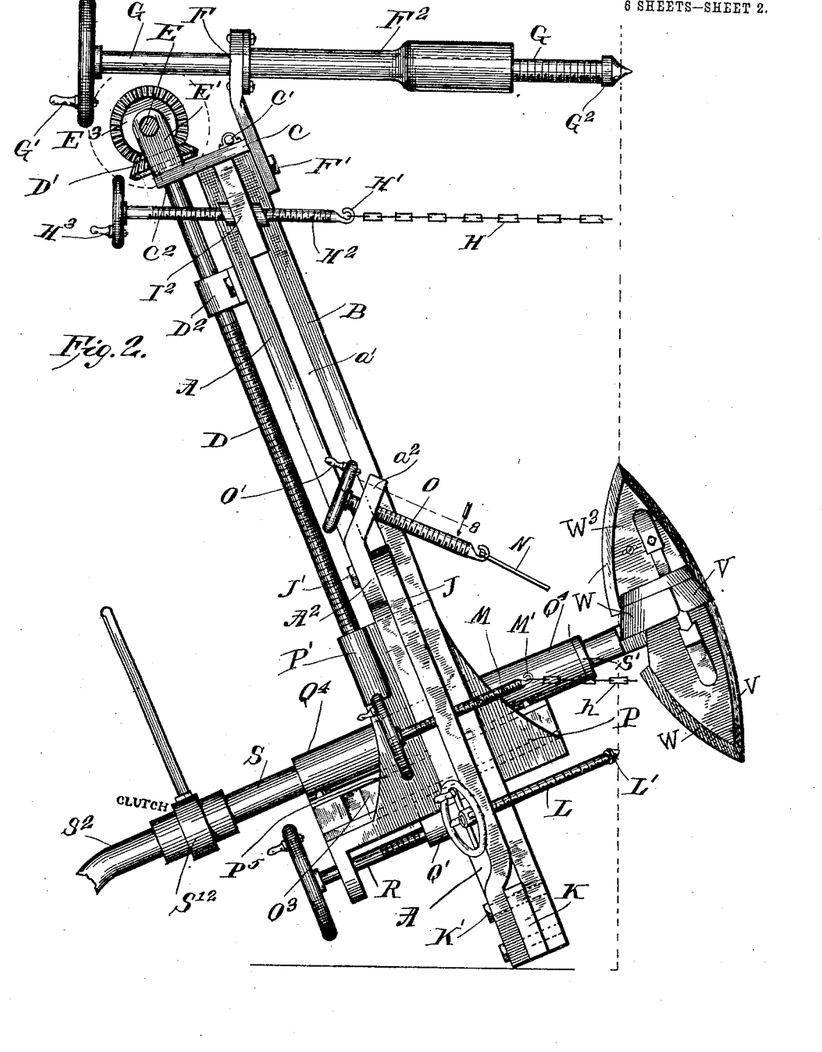
Fig. 2 is a side elevation thereof.

At their upper ends the opposite uprights are connected by the top plate C, on which is supported a spirit-level C', and this top plate projects forwardly beyond the uprights and is provided at $C^2$ with bearings for the upright screws D and is also provided with boxes E', in which is journaled a cross-shaft E, having the handle $E^2$ and the bevel-gears $E^3$, the latter meshing with bevel-gears D' on the upper ends of the screw-shafts D, so that the screw-shafts may be operated to turn the feed shafts or screws, as will be understood from Figs. 1 and 2 of the drawings. The upper part of the main frame is also provided with an arch or cross-bar F, bolted at F' to the opposite uprights and supporting a bearing $F^2$, in which is threaded the upper tension-shaft G, having the handle G' at its outer end and the swiveled point $G^2$ at its inner end and arranged to force the upper end of the main frame away from the tree in opposition to the chain H, which binds such end of the frame to the tree, as will be understood from Fig. 2, and to adjust the machine to any desired angle to the tree. The chain H encircles the tree and is secured at its ends to the hooks H' on the inner ends of screws $H^2$, which are threaded at I' in the extended ends $I^2$ of a cross-bar, secured between the front and rear bars of the uprights immediately below the top plate C. The screws $H^2$ are provided at their outer ends with the handles $H^3$ and may be conveniently operated to tighten the chain H, and this chain may be tightened in opposition to the screw-shaft G and said parts be operated jointly to secure the upper end of the main frame in any desired relation to the tree and to bind it firmly in such relation, as will be understood from Fig. 2 of the drawings. It will be noticed that the extensions $I^2$, project laterally beyond the uprights in order to get a considerable width between the opposite chain securing screws $H^2$, as best shown in Fig. 1.

Figure 8:
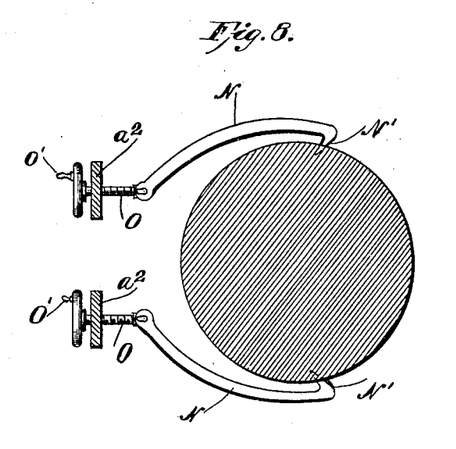
Fig. 8 is a detail cross-section on about line 8 8 of Fig. 2, illustrating the dogs for gripping the tree.

At its lower end the main frame is provided with the laterally-projecting wings J in the form of plates fitting at their inner edges between the front and rear bars A and B, bolted near their upper ends at J' between said bars and preferably to the lateral lugs $A^2$ on the bars A and projecting downwardly therefrom in line with the space $a'$ between the bars A and B and deflected near their lower ends to lap on the outer sides of the lower cross-bar K, to which they are secured by the bolts K', as shown. The lower crossbar K may be arched at $K^2$ to fit over a treestump or to conform to the side of the tree when it is desired to so adjust said part. These lateral wings J form bearings for the tension or bracing screws L and for the lower chain-securing screws M, said screws being threaded in suitable bearings in the wings J and being provided at their inner ends, respectively, with swiveled heads L' and hooks M', the hooks M' securing the chain $h$ and the swiveled pointed ends L' bearing against the tree and said parts coöperating like the upper tension screw and chain in securing the frame in any desired relation to the tree and binding it firmly in such relation in the use of the invention. We also employ the pointed hooks or dogs N, pointed at N', to engage with the tree, as best shown in Fig. 8, and connected at their other ends with the inner ends of screws O, which have the handles O' and turn in threaded bearings in the inclined wings $a^2$ of the lateral lugs $A^2$ of the opposite uprights.

By the described tension-screws G and L, chain-securing screws $H^2$ and M, and the dogs N and their operating-screws we are able to brace the main frame securely in connection with the tree and to hold it in such connection during the operation of the cutter and its supporting cross-head, as will be more fully described.

Figure 3:
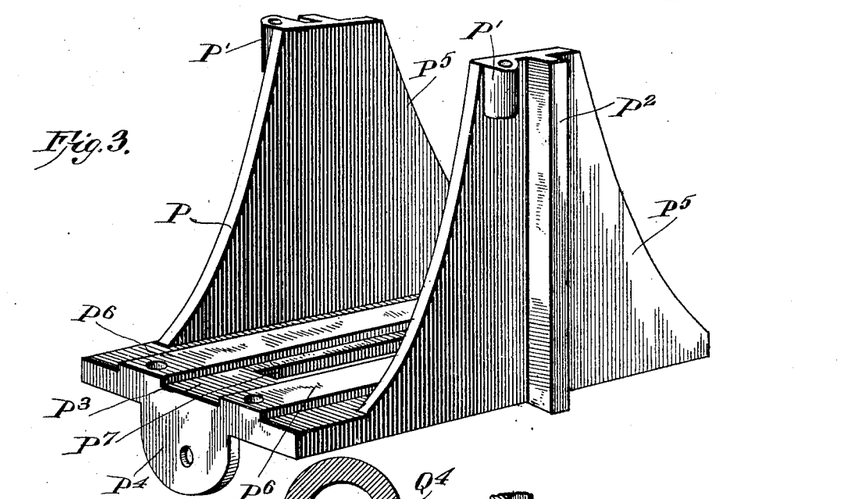
Fig. 3 is a detail perspective view of the body portion of the cross-head.
Figure 4:
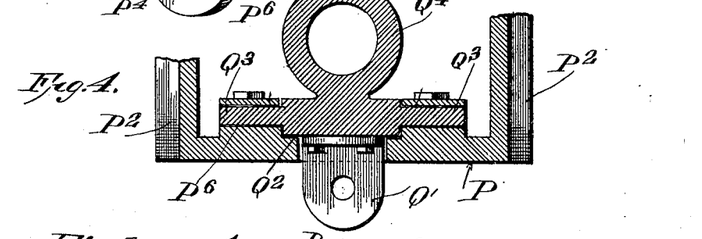
Fig. 4 is a detail vertical cross-section of the cross-head on about line 4 4 of Fig. 5.
Figure 5:
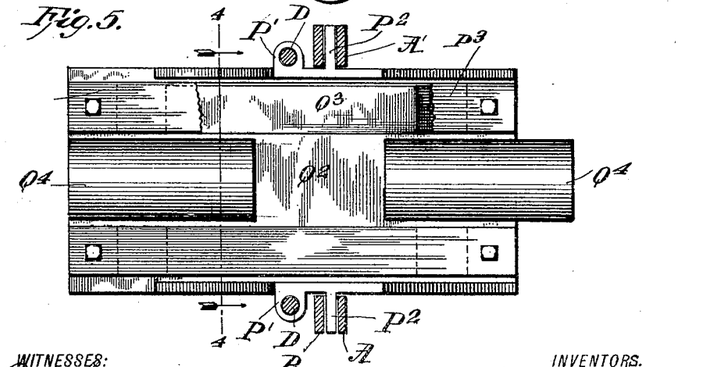
Fig. 5 is a detail top plan view of the cross-head, parts of the side bars of the main frame being shown in section.
Figure 6:
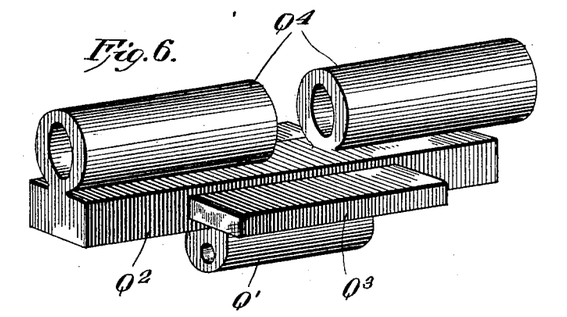
Fig. 6 is a detail perspective view of the transversely-movable portion of the cross-head.
Figure 7:
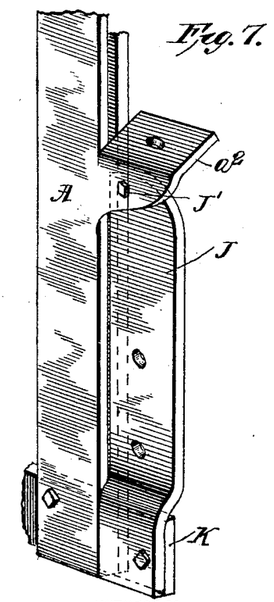
Fig. 7 is a detail perspective view of a part of the lower end of the main frame.

The main screws D for operating the crosshead vertically or in the direction of length of the main frame are journaled in bearings in the top plates C and also in bearings $D^2$ on the opposite uprights below the top plate C and are threaded at their lower ends in bearings P' on the opposite sides of the body portion of the cross-head. The cross-head, as shown, comprises the body portion P and a transversely-movable part or portion. The body portion P is provided on its opposite sides with the upright rails or ribs $P^2$, which slide in the guideways $a'$ of the opposite uprights. The body portion P also has a bottom plate $P^3$, having at its front edge the central depending lug $P^4$, forming a bearing for the transverse screw R, which moves the portion of the cross-head transversely. On the bottom plate $P^3$ between the upright plates $P^5$ we provide the transverse rails $P^6$ for the portion of the cross-head, and in said plate $P^3$ we form the opening $P^7$, through which drops the lug Q', in which the operating-screw R works in adjusting the portion transversely within the body portion of the cross-head, as will be understood from Figs. 3 and 4 of the drawings.

The tool-carrier of the cross-head is provided with the base $Q^2$, from which drops the bearing Q' for the feed-screw R, and this base $Q^2$ rests upon the base-plate $P^3$ between the rails $P^6$ at the opposite ends of the opening $P^7$, and lateral wings $Q^3$ rest upon these rails $P^6$ and slide thereon in the transverse movement of the tool-carrier. This tool-carrier is provided with the bearings $Q^4$ for the toolshaft S, and the tool may be operated by the turning of this shaft S, which may be operated by hand or by any suitable power, it being preferred to couple with the shaft S a flexible shaft $S^2$, by which the shaft S may receive power from an electric or other motor device. The cutter-shaft S has near its inner end an outwardly-facing shoulder S', (see Fig. 2,) which bears against the bearing $Q^4$ of the cutter-carrier, so the carrier may be moved transversely by its screw R to positively feed the cutter into the tree. $S^{12}$ is a sleeve-clutch for the purpose of starting or stopping the cutter-head without stopping the motor or power. As this clutch forms no part of the present invention and may be of any suitable well-known form of clutch, it does not seem necessary to illustrate the same in detail herein. It will be noticed that we provide a cross-head having a body portion movable in the direction of length of the main frame and means for moving such body portion in such direction, together with a tool-carrier which is movable transversely in the body portion, and the tool-shaft is journaled in this transversely-movable portion, so it can be moved thereby and is also arranged for movement independent of the tool-carrier whenever it is desired to set the tool by hand. By this we mean that while the shaft S is prevented from moving outwardly from the position shown in Fig. 2 by the shoulder S' said shaft S may be moved to the right by sliding it longitudinally in the bearing $Q^4$, as will be understood from Fig. 2 of the drawings.

The tool is of a special construction, as will be described, and is adapted to cut in the side of the sap-bearing tree a pocket forming the so-called "turpentine-box," having inwardly-converging walls and a flaring mouth to facilitate access to the sap accumulated in the box for convenience in removing the same.

Figures 9, 10, 11:
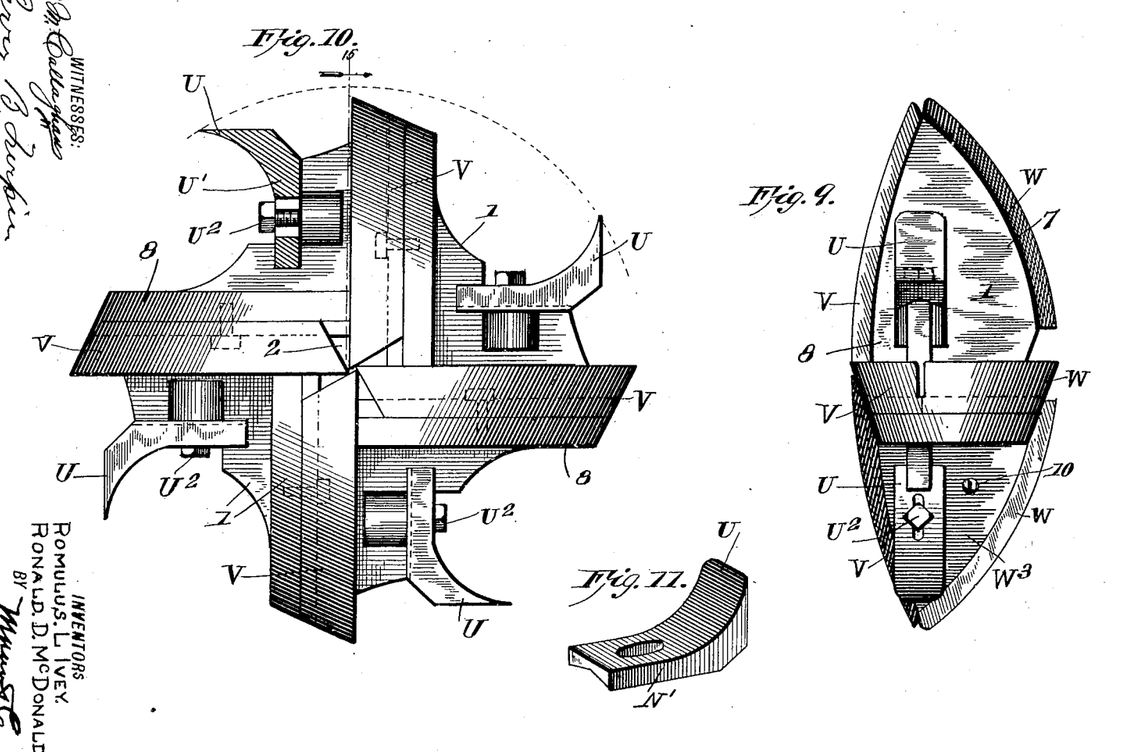
Fig. 9 is an edge view of the cutter.
Fig. 10 is a side elevation thereof.
Fig. 11 is a detail perspective view of the edge or lead cutter.
Figures 12, 13, 14, 15, 16:
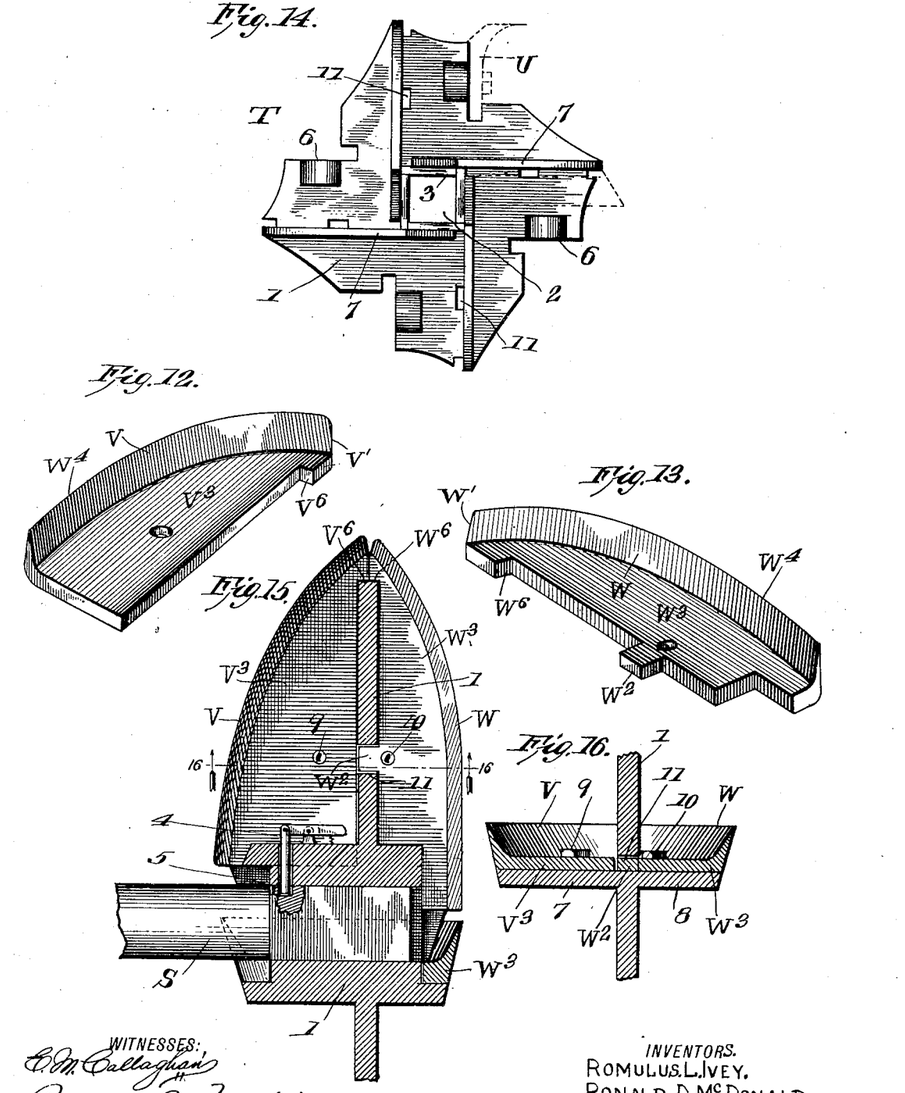
Fig. 12 is a detail perspective view of one of the wide side cutters used at the outer side of the body or stock.
Fig. 13 is a view of one of the narrower cutters used at the inner side of the body or stock.
Fig. 14 is a side elevation of the body or stock of the cutter, taken from the side thereof opposite that shown in Fig. 10.
Fig. 15 is a cross-section of the cutter on about line 15 15 of Fig. 10.
Fig. 16 is a cross-section on about line 16 16 of Fig. 15.

In constructing the cutter T we provide a body or stock 1, which may be cast or otherwise formed from steel in one piece with the central opening 2 to fit on the shaft S with the hub 3 surrounding such opening and having a key 4 to enter a socket 5 in the cutter-shaft and secure the cutter detachably on the shaft as desired. The plate 1 is cut away in its edges to allow a suitable clearance for the lead-cutters U, such cutters having their shanks N' secured by the bolts U² to the edges 6 of the cutter-stock, the cutters U being arranged to operate in the central line of the cutter-head and operate as leads for the outer ends V' and W' of the cutters V and W, such ends of the side cutters V and W being brought close together, as shown in Fig. 15. On the opposite sides of the body-plate 1 I provide the ribs 7 and 8, to which the face-plates of the side cutters V and W are bolted at 9 and 10, as shown in Fig. 15. The body-plate 1 of the stock is provided at 11 with a perforation into which projects a lug W² on the inner edge of the face-plate W³ of the side cutter W, and the side cutters W have their face-plates W³ and their cutting-wings W⁴ extended inwardly to overlap the hub of the cutter-head, as shown in Figs. 10 and 14, in order that the opposite cutters may cut past each other at their inner ends in completing the cutting of the inner side of the so-called "box" in the tree-trunk.

At their outer ends the face-plates V³ and W³ of the cutters are provided with the laterally-projecting cutting edges W⁴, which are curved toward their outer ends and slope inwardly toward such ends V' and W', where they overlap the outer edge of the body plate 1 of the stock, the face-plates V³ and W³ being shouldered at V⁶ and W⁶ to overlap such end of the stock 1, as shown.

The inner and outer blades V and W are curved on different arcs, the inner cutter-blades W being given a slight curve and a very slight bilge or swell in order to prevent cutting into the heart of the tree in forming the so-called "box," while the outer blades V are given a greater bilge or swell, so that in cutting the lower edge of the mouth of the pocket they will form such edge on approximately a horizontal line or so that the sides of the mouth will not drop below the middle portion of the mouth, thus preventing any leakage at the corners of the mouth and increasing the holding capacity of the box to prevent wasting. This is an important feature of our invention, as by it we cut a pocket forming the so-called "mouth" in a tree by a revolving tool, and such pocket will have the greatest capacity possible, so that the sap may be accumulated and retained until collected into the usual vessels for use as desired.

We thus provide a revolving tool having the lead blades or cutters arranged midway between its inner and outer faces and having at its opposite inner and outer faces curved blades with their cutting edges extending approximately in the line of direction of the revolution of the cutter-head and with the outer blades given a considerable swell or bilge in order to form the mouth of the pocket or box in the tree-trunk of the desired shape.

Having thus described our invention, what we claim as new, and desire to secure by Letters Patent, is—

1. In a machine substantially as described, the combination of the cross-head having the body portion provided with side rails or ribs, and the transversely-movable tool-carrier having bearings for the cutter-shaft, the cutter-shaft in said bearings having a shoulder limiting the outward movement of the shaft, whereby the shaft may be fed inwardly by a feed-screw, the feed-screw for feeding the tool-carrier transversely, the main frame having the opposite uprights composed of front and rear bars spaced apart to form guideways for the rails of the cross-head, said cross-head being provided with upright bearings for its adjusting-screws, the adjusting-screws journaled to the main frame and threaded in the bearings of the cross-head, the cross-shaft geared with the screws for adjusting the cross-head, the upper and lower tension-screws for pressing the main frame away from a tree, chains to pass around the tree and the screws connected with the main frame for tightening said chains to hold the main frame to the tree, the dogs adapted at one end to engage with the tree, and the screws connecting the other ends of the dogs with the main frame for securing the main frame to the tree, all substantially as and for the purposes set forth.

2. In a machine substantially as described, the combination with the main frame, the cutter for forming a box in a tree, and the means for supporting and adjusting the cutter, of means for binding the main frame in connection with the tree, and means for pressing the main frame away from the tree in opposition to the binding means, substantially as set forth.

3. In a machine substantially as described, the combination of the uprights spaced apart forming a way for the cross-head, and consisting of front and rear bars spaced apart forming guides for the rails or ribs on the cross-head, the top plate connecting the cross-bars and having bearings for the cross-shaft and for the screw-shafts, the cross-shaft and the screw-shafts being geared together, the upper cross-bar extending between the uprights and projecting beyond the same and having bearings for the upper chain-securing screws, the arch or cross bar extending between the upper ends of the uprights and having a bearing for the upper tension-screw for pressing the frame away from a tree, and adjusting the machine to any desired angle with the tree, a chain for connection with the chain-screws and adapted to pass around a tree, the cross-head having bearings for its feed-screws and comprising the main or body portion, and the cutter-carrier movable transversely therein, means for moving the cutter-carrier transversely of the body portion of the cross-head, the cutter and its shaft, means for bracing the lower end of the main frame away from a tree, the lateral lugs on the front bars of the uprights and having the rearwardly-inclined wings provided with bearings for dog-securing screws, the dog-securing screws and the dogs connected at one end with the screw and adapted at their other ends to engage with a tree-trunk, substantially as and for the purposes set forth.

4. The combination in a machine substantially as described, of the main frame, uprights having front and rear bars spaced apart the front bars being provided with lateral lugs having projecting wings forming bearings for dog-securing screws, the said screws and the dogs secured thereto, the lower cross-bar connecting the uprights and extending laterally beyond the same, the plates J secured at their upper ends to the laterally-projecting lugs of the uprights and lapping at their lower ends along the extended ends of the lower cross-bar and secured thereto, and screws threaded in said plates and adapted to brace the lower end of the main frame away from a tree-trunk, a chain to pass around the tree-trunk and screws threaded in said plates for tightening such chain, substantially as and for the purposes set forth.

5. A machine for cutting boxes in turpentine-trees, comprising a main frame, means for securing and bracing the main frame in connection with a tree, a cutter-head adapted to cut the box in the tree, and means supported by the main frame for carrying and adjusting the said cutter, substantially as set forth.

6. The combination in a machine for cutting boxes in turpentine-trees, of a main frame having the opposite uprights connected together, lateral extensions beyond the uprights, screw devices carried by the said lateral extensions for securing and bracing the main frame in connection with a tree-trunk, a cross-head movable between the uprights and having a transversely-movable cutter-carrier, means for adjusting the cross-head longitudinally between the uprights, means for adjusting the cutter-carrier transversely, and the cutter and its shaft supported by said carrier, substantially as set forth.

7. A machine for cutting boxes in turpentine-trees, comprising a cutter and its shaft, a main frame, a cross-head operating in said main frame and having bearings for the cutter-shaft, and devices carried by the main frame for securing and bracing the same in connection with a tree-trunk, substantially as set forth.

8. A machine for use in cutting turpentine-boxes comprising a main frame, a cross-head movable in said frame and having a transversely-movable cutter-carrier, means for holding the main frame to and bracing it from a tree, the cutter-shaft journaled in the carrier portion of the cross-head and a cutter-head on the said shaft having at its inner and outer sides cutting-plates whose outer edges are projected in the direction of revolution of the cutter and are curved from the center of the cutter outwardly toward its periphery to form the curved inner and outer walls of a box in a tree-trunk, substantially as set forth.

9. In a machine substantially as described, a cutter-head having on its inner and outer sides cutter-blades curving from the center of the head outwardly, the cutting edges of the blades projecting in the direction of revolution of the head, substantially as and for the purposes set forth.

10. A cutter-head, comprising the body or stock, the edge or lead cutters secured to said stock and the side cutters on opposite sides of the stock having their cutting edges curved from end to end, substantially as described.

11. A cutter-head for cutting turpentine-boxes in tree-trunks comprising a body or stock and blades at the inner and outer sides thereof, the blades at the outer side of the stock being given a bulge or swell whereby to cut the mouth of the turpentine-box approximately level, substantially as described.

12. The combination in a cutter-head of the body-plate, the ribs projecting on the opposite sides thereof and the side cutters having the face-plates lapped against and secured to said ribs and their outer cutting edges curved, substantially as described.

13. In a cutter-head the combination with the body or stock plate having on its opposite sides the projecting ribs and provided with the openings alongside said ribs, of the side cutters secured to the ribs on opposite sides of the stock or body plate, one set of said cutters being provided with lugs projecting into the openings in said body-plate and means securing the cutters to the oppositely-projecting ribs, substantially as set forth.

14. The combination in a cutter-head with the body-plate and the ribs projecting therefrom, of the side cutters having their face-plates lapped alongside of and secured to said ribs, said side cutters being curved on their outer edges and overlapping at their outer ends the outer edge of the body-plate, substantially as set forth.

15. The combination in a cutter-head with a body or stock plate provided on its opposite sides with the projecting ribs and having in its outer edge notches alongside the said ribs of the side cutters having their face-plates lapping alongside of and secured to the said ribs and provided at their outer ends with projecting portions fitting in the edge notches of the stock-plate and lapping the outer edge of the said plate, substantially as set forth.

16. A cutter-head for use in cutting turpentine-boxes in tree-trunks having cutters at its inner and outer sides and presenting in cross-section a form tapering toward its periphery whereby said cutter when revolved in contact with and at an inclined angle to a tree-trunk, will cut a pocket constituting the so-called box in said trunk, substantially as set forth.

17. A cutter-head for cutting turpentine-boxes in tree-trunks comprising a body or stock, edge or lead cutters at the periphery of said cutter-head and inner and outer side cutters having their outer or cutting edges curving gradually toward each other at the periphery of the cutter-head, the lead-cutters being arranged between the adjacent pairs of side cutters, substantially as and for the purposes set forth.

18. A revolving tool for cutting turpentine-boxes in tree-trunks comprising the body or stock, the lead blades or cutters arranged midway between its inner and outer faces and the inner and outer curved blades at the opposite faces of the cutter with their cutting edges extending approximately in the line of direction of revolution of the cutter-head and with the outer blades given a swell or bilge whereby to form the mouth of the pocket or box on approximately a straight line at its lower edge, substantially as set forth.

ROMULUS LESLIE IVEY.
RONALD DONAL McDONALD.

Witnesses:
JOHN W. SMOCK,
A. E. GLEASON.